(12) United States Patent
Blot-Lefevre (10) Patent No.: US 9,355,274 B2
(45) Date of Patent: May 31, 2016

(54) METHOD AND DEVICE FOR ARCHIVING A DOCUMENT

(75) Inventor: Eric Blot-Lefevre, Neuilly sur Seine (FR)

(73) Assignee: TrustSeed SAS, Galluis (FR)

(*) Notice: Subject to any disclaimer, the term of this patent is extended or adjusted under 35 U.S.C. 154(b) by 945 days.

(21) Appl. No.: 13/260,491

(22) PCT Filed: Mar. 25, 2010

(86) PCT No.: PCT/EP2010/053953
§ 371 (c)(1),
(2), (4) Date: Dec. 6, 2011

(87) PCT Pub. No.: WO2010/108994
PCT Pub. Date: Sep. 30, 2010

(65) Prior Publication Data
US 2012/0070001 A1  Mar. 22, 2012

(30) Foreign Application Priority Data

Mar. 26, 2009 (FR) ..................... 09 01441
Mar. 26, 2009 (FR) ..................... 09 01442

(51) Int. Cl.
*G06F 21/62* (2013.01)
*H04L 9/08* (2006.01)
(Continued)

(52) U.S. Cl.
CPC ............ *G06F 21/6272* (2013.01); *H04L 9/083* (2013.01); *H04L 9/0894* (2013.01); *H04L 9/32* (2013.01); *H04L 63/0442* (2013.01); *H04L 67/06* (2013.01); *G06F 2221/2151* (2013.01)

(58) Field of Classification Search
CPC ............. G06F 21/6272; H04L 9/0894; H04L 63/0442; H04L 9/083; H04L 9/32
USPC .......... 380/259, 277, 278, 281, 286; 713/155, 713/165, 168, 175; 726/26, 27
See application file for complete search history.

(56) References Cited

U.S. PATENT DOCUMENTS 5,850,443 A * 12/1998 Van Oorschot et al. ...... 380/285
6,145,079 A * 11/2000 Mitty et al. .................. 713/170
(Continued)

FOREIGN PATENT DOCUMENTS

WO    WO 02/093849 A    11/2002

OTHER PUBLICATIONS de Souza, Túlio Cicero Salvaro, Jean Everson Martina, and Ricardo Felipe Custódio. "Audit and backup procedures for hardware security modules." Proceedings of the 7th Symposium on Identity and Trust on the internet. (pp. 88-97). ACM, 2008.*
(Continued)

*Primary Examiner* — Kari Schmidt
(74) *Attorney, Agent, or Firm* — Stroock & Stroock & Lavan LLP (57) ABSTRACT

The method for archiving a document includes a step of encryption of the document with a symmetric key, a step of transmission of said encrypted document to an archiving operator, and a step of transmission of the symmetric encryption key of said document to an escrow operator distinct from the archiving operator. The method may also include a step of encrypting of the symmetric key with a key consisting of a dual key comprising asymmetric keys. Depending on whether it is applied to personal archiving or to document transmission, during the step of encryption with the asymmetric key, the asymmetric key is that of the user having transmitted said document or that of the recipient of the document.

11 Claims, 6 Drawing Sheets

(51) Int. Cl.
*H04L 9/32* (2006.01)
*H04L 29/06* (2006.01)
*H04L 29/08* (2006.01)

(56) References Cited

U.S. PATENT DOCUMENTS

| | | | |
|---|---|---|---|
| 6,754,827 B1* | 6/2004 | Cane et al. | 713/193 |
| 7,171,000 B1* | 1/2007 | Toh | G06Q 20/382 380/278 |
| 7,181,016 B2* | 2/2007 | Cross et al. | 380/281 |
| 7,298,851 B1* | 11/2007 | Hendricks et al. | 380/282 |
| 7,707,642 B1* | 4/2010 | Herbach et al. | 726/27 |
| 2002/0101998 A1* | 8/2002 | Wong | H04L 9/0894 380/286 |
| 2007/0136821 A1* | 6/2007 | Hershaft et al. | 726/27 |
| 2007/0294533 A1* | 12/2007 | Toh et al. | 713/170 |
| 2008/0005024 A1* | 1/2008 | Kirkwood | 705/50 |
| 2009/0158037 A1* | 6/2009 | Lee et al. | 713/165 |
| 2009/0276861 A1* | 11/2009 | Russo et al. | 726/30 |
| 2009/0327702 A1* | 12/2009 | Schnell | 713/155 |
| 2010/0325732 A1* | 12/2010 | Mittal et al. | 726/26 |

OTHER PUBLICATIONS

Denning, Dorothy E., and Miles Smid. "Key escrowing today." Communications Magazine, IEEE 32.9 (1994): 58-68.*
Victor Shoup: "A Proposal for an ISO Standard for Public Key Encryption (version 2.1)" Dec. 20, 2001, online, page complete.
International Search Report and Written Opinion dated Sep. 15, 2010, issued in counterpart International Application No. PCT/EP2010/053953.

* cited by examiner

METHOD AND DEVICE FOR ARCHIVING A DOCUMENT

CROSS-REFERENCE TO RELATED APPLICATIONS

This application is a national phase application under §371 of PCT/EP2010/053953, filed Mar. 25, 2010, which claims priority to French Patent Application No. 0901441, filed Mar. 26, 2009 and French Patent Application No. 0901442, filed Mar. 26, 2009 all of which are incorporated herein in their entirety.

BACKGROUND

1. Field of the Invention

Various embodiments of the present invention relate to a method and a device for encrypting a document, and in particular to the confidential or secret archiving of documents for subsequent retrieval by their legitimate owner and to the confidential transmission of documents to a recipient.

2. Description of the Related Art

Numerous encryption methods are known, based on symmetric keys or asymmetric dual keys (for example conforming to the public key infrastructure PKI). However, these encryption methods are not suitable for providing both a high level of security of the documents and a possibility of retrieval of the documents if the keys are lost (for example, in the case of decease of their owner or of a legal decision aimed at retrieving them).

BRIEF SUMMARY

Various embodiments of the present invention aim to remedy these drawbacks.

To this end, embodiments of the present invention disclose a method for archiving a document by a user comprising a step of encryption of the document with a symmetric key and a step of transmission of said encrypted document to an archiving operator; a step of transmission of the symmetric encryption key of said document to an escrow operator distinct from the archiving operator; and a step of encryption of the symmetric key with a key having a dual key comprising asymmetric keys.

Advantageously, an embodiment method comprises a step of generation of said symmetric key for each document to be encrypted.

Advantageously, said symmetric key can be different for each document to be encrypted.

Advantageously, during the step of encryption with the asymmetric key, said asymmetric key can be the public key of the user having transmitted said document.

Advantageously, during the step of encryption with the asymmetric key, said asymmetric key can be the public key of a user receiving the document.

Advantageously, embodiment methods also comprise a step of deletion of the encrypted document and of retention of the symmetric key by the computer system performing the encryption steps.

Advantageously, an embodiment method also comprises a step of transmission by the archiving operator to the user of the encrypted document, a step of transmission by the escrow operator to said user of the symmetric encryption key of the encrypted document and a step of decryption by said user of said encrypted document with said symmetric key.

Advantageously, an embodiment method also comprises a step of transmission by the archiving operator to an authorized third party of the encrypted document, a step of transmission by the escrow operator to said authorized third party of the symmetric encryption key of the encrypted document and a step of decryption by said authorized third party of said encrypted document with said symmetric key.

Embodiments of the invention also disclose a device for archiving a document by a user comprising a module configured to encrypt said document with a symmetric key, a module configured to transmit said encrypted document to an archiving operator, a module for transmitting the symmetric encryption key of said document to an escrow operator separate from the archiving operator, and a module for encrypting the symmetric key with a key having a dual key comprising asymmetric keys.

Advantageously, an embodiment device further comprises a means for generating said symmetric key for each document to be encrypted.

Advantageously, said symmetric key can be different for each document to be encrypted.

Advantageously, an embodiment device further comprises a module configured to handle the transmission by the archiving operator to the user of the encrypted document, a module configured to handle the transmission by the escrow operator to said user of the symmetric encryption key of the encrypted document and a module configured to handle the decryption by said user of said encrypted document with said symmetric key.

Advantageously, an embodiment device also comprises a module configured to handle the transmission by the archiving operator to an authorized third party of the encrypted document, a module configured to handle the transmission by the escrow operator to said authorized third party of the symmetric encryption key of the encrypted document and a module configured to handle the decryption by said authorized third party of said encrypted document with said symmetric key.

The particular advantages, aims and features of this device can be similar to those of an embodiment method, as briefly explained hereinabove, so they will not be reviewed here.

BRIEF DESCRIPTION OF THE DRAWINGS

Other advantages, aims and features of the present invention will become apparent from the following description, given as a non-limiting explanatory example, in light of the appended drawings in which.

DETAILED DESCRIPTION

Figure 1:
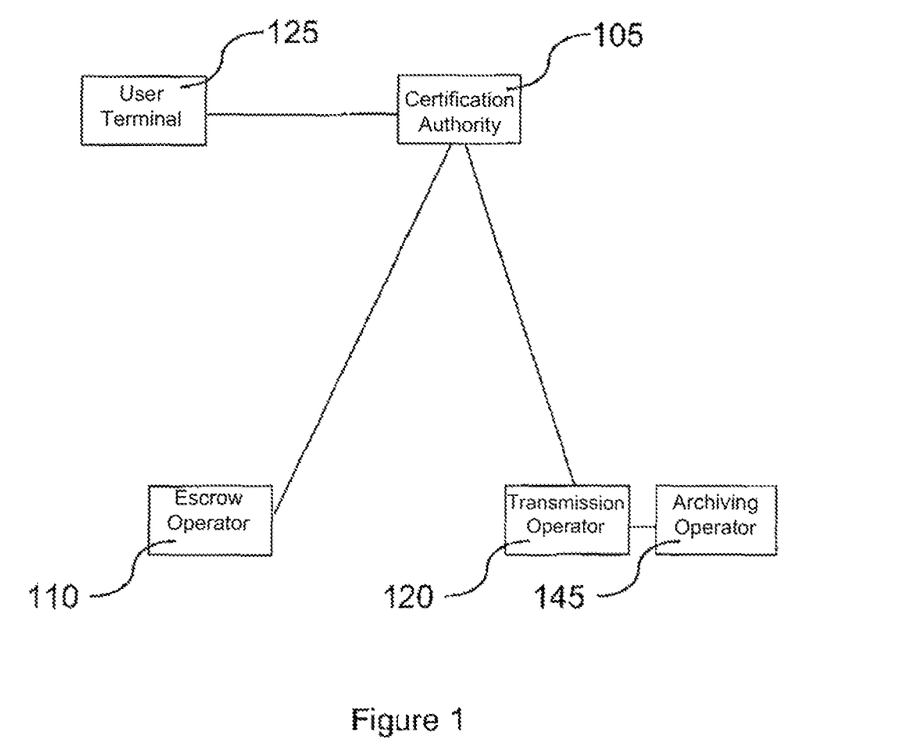
FIG. 1 schematically represents a first particular embodiment device suited to the case in which the sender is also the recipient of the processed document.

FIG. 1 shows a scheduling and certification agency/authority 105, an escrow operator 110, a transmission operator 120 and an archiving operator 145. A first user, also hereinafter called a "sending" user, sets up a terminal 125 to interact with the agency 105.

The scheduling and certification agency/authority 105, the escrow operator 110, the transmission operator 120 and the archiving operator 145 generally set up servers (not represented) which communicate, with one another, via computer networks (not represented), for example the Internet.

For each document archival or transmission, the use is made, in accordance with an embodiment of the present invention, of a symmetric key. This symmetric key is preferably assigned to the sending user for each document that he archives or transmits.

Figure 2:
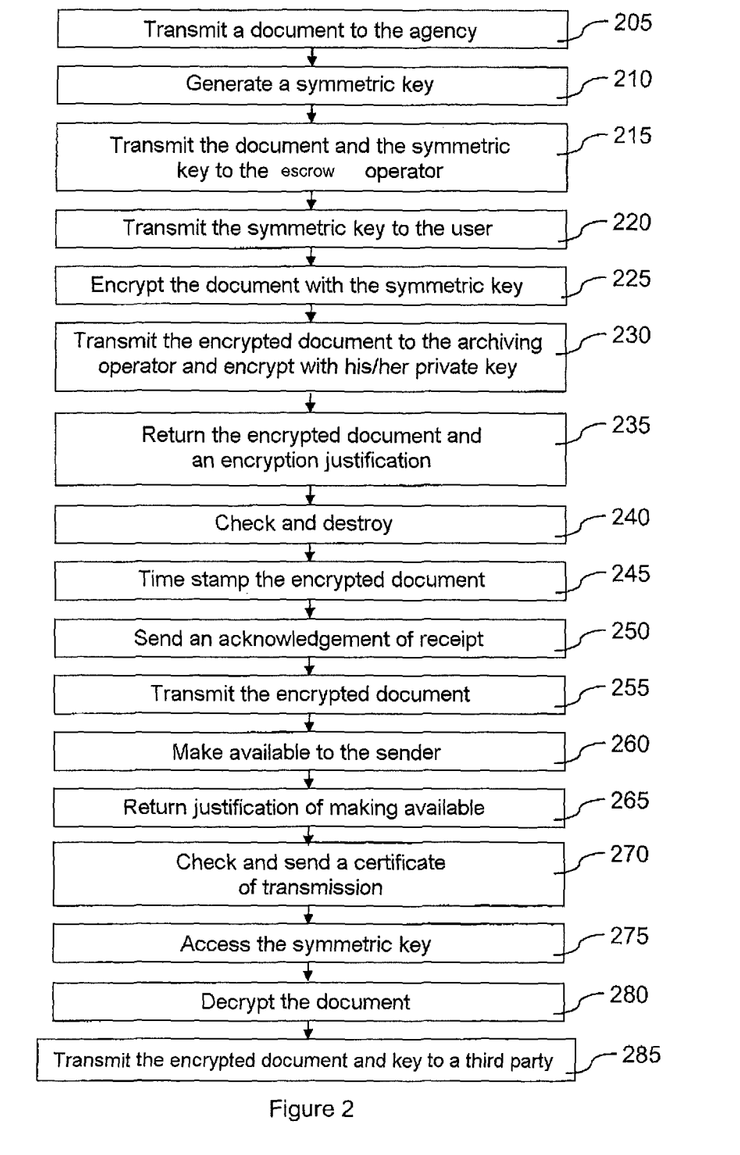
FIG. 2 represents, in the form of a flow diagram, a first particular embodiment method for transmission of a document suited to the case in which the sender is also the recipient of the processed document and does not have a personal dual key, FIG. 3 schematically represents a second particular embodiment device suited to the case in which the sender and the recipient of the processed document are separate.

As can be seen in FIG. 2, to perform an encrypted archiving of a document when the sender does not have a dual key, the terminal 125 transmits this document unencrypted, to the scheduling and certification agency 105, during a step 205.

During a step 210, the agency 105 generates a symmetric encryption key. As a variant, it is the terminal 125 of the sending user which supplies this symmetric encryption key to the agency 105.

Then, during a step 215, the agency 105 transmits the document and the symmetric key to the escrow operator 110. During a step 220, the agency 105 transmits this symmetric key to the private management office (BPG) of the sending user. The private management office is a space made available to a user by a community application provider, in this case combined with the agency 105, and protected at least by a user name and a password known only to this user.

During a step 225, the escrow operator 110 performs the encryption of the document with the symmetric key received during the step 215. During a step 230, the escrow operator 110 retains the symmetric key and transmits the document, encrypted with the symmetric key, to the archiving operator who performs a second encryption, with his/her own private key, of the document already encrypted with the symmetric key and retains the doubly-encrypted document.

During a step 235, the escrow operator returns to the agency 105 the encrypted document with the symmetric key and a summary list encryption justification, which justifies the carrying out of all the steps provided to handle the encryptions.

During a step 240, the agency 105 checks the encryption justification, destroys the unencrypted document and the symmetric key and has the unencrypted document retained by the receiving third party 110 destroyed.

During a step 245, the agency 105 performs a time-stamping of the encrypted document and of the encryption justification.

During a step 250, the agency 105 sends an acknowledgement of receipt and of time-stamped encryption certification to the escrow operator 110 and the escrow operator 110 retains this acknowledgement of receipt and of certification as well as the symmetric key of the sending user but destroys the encrypted document.

During a step 255, the agency 105 transmits the encrypted document to the transmission operator 120. During a step 260, the transmission operator 120 places the encrypted document in the correspondence current account of the sender. During a step 265, the transmission operator 120 returns to the agency 105, via the trusted third party 115, a summary list justification of the placement of the encrypted document in the correspondence current account of the sender. This justification represents the correct completion of all the steps linked to the placement of the encrypted document in the correspondence current account of the sending user.

During a step 270, the agency 105 transmits to the transmission operator 120 a time-stamped transmission certificate.

To reread the document, during a step 275, the sender accesses the symmetric key and, during a step 280, the sender decrypts the encrypted document. The steps 275 and 280 are possibly handled via the receiving third party with time-stamping and transmission at the agency 105 of a summary list decryption justification.

If necessary, for example for legal instruction operations and/or on a rogatory commission, during a step 285, the symmetric key retained by the escrow operator and the encrypted document retained by the archiving operator are transmitted to a third party who decrypts the encrypted document with this symmetric key.

Thus, in the case of the personal archiving (the sender and the recipient of the document are the same) in which the sender does not have a dual key, the document is encrypted with a symmetric key assigned exclusively to this document. The symmetric key used to encrypt the document remains with the receiving third party and it is retained by the sender of the document in his/her private management office.

The document encrypted by the symmetric key with the receiving third party is sent to the archiving third party (for example a trusted third party operator) who performs a second encryption with his/her private key for legal archiving.

If the sender wants to decrypt and consult his/her document in clear, he can do so in his/her private management office, which is secured. Either he/she has retained, in this private management office, the symmetric key received during the step 220 and the encrypted document available in his/her correspondence current account and the decryption is done simply in his/her private management office, based on these two items.

Or, the archiving third party sends the decrypted document with his/her public key but still encrypted with the symmetric key, to the community application provider which manages the private management office of the sender. Thus, the sender can decrypt the document, by performing a decryption with the symmetric key associated with this document, in his/her private management office.

As a variant, the archiving third party sends the doubly-encrypted document to the community application provider. Thus, the sender can decrypt the document, by first performing a decryption with the public key of the trusted third party operator then with the symmetric key held in his/her office for this document decrypt the document.

In case of a rogatory commission or a notarial procedure (decease, guardianship, etc.), it is always possible to ask the receiving third party to decrypt the document without the intervention of the sender of the document. In fact, as has been seen, the receiving third party has a symmetric key dedicated to the document which is sufficient to decrypt it.

Figure 3:
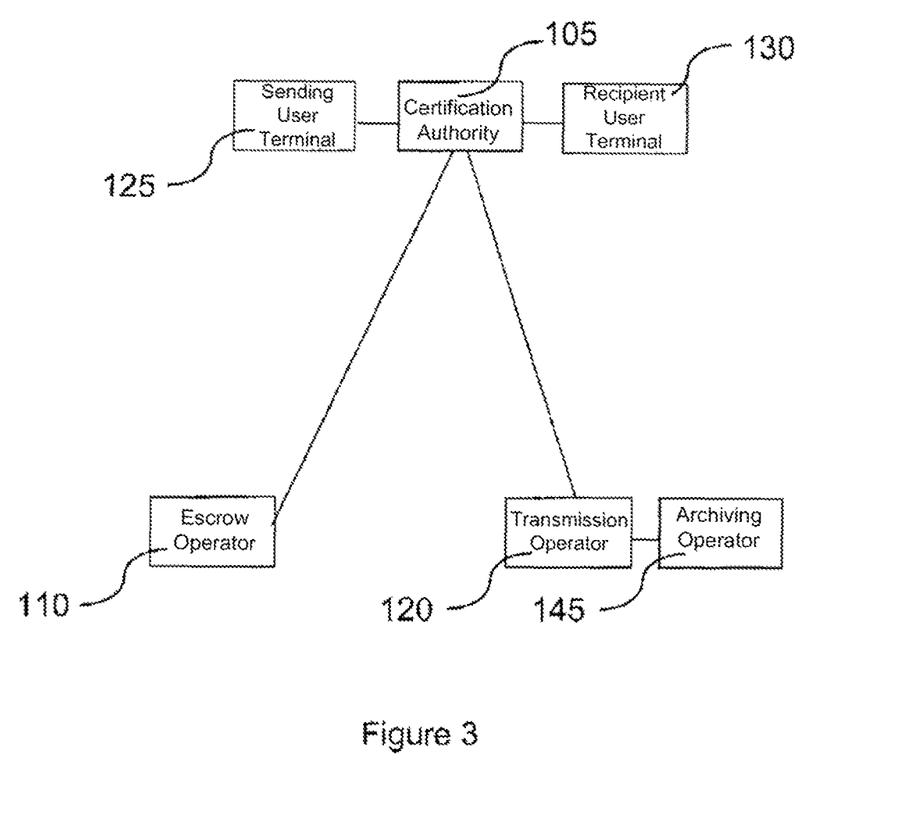

FIG. 3 shows a scheduling and certification agency/authority 105, a escrow operator 110, a transmission operator 120, and an archiving operator 145. A first user, also hereinafter called "sending" user, sets up a terminal 125 to interact with the agency 105. A second user, also hereinafter called "recipient" user, sets up a terminal 130 to interact with the transmission operator 120.

Figure 4:
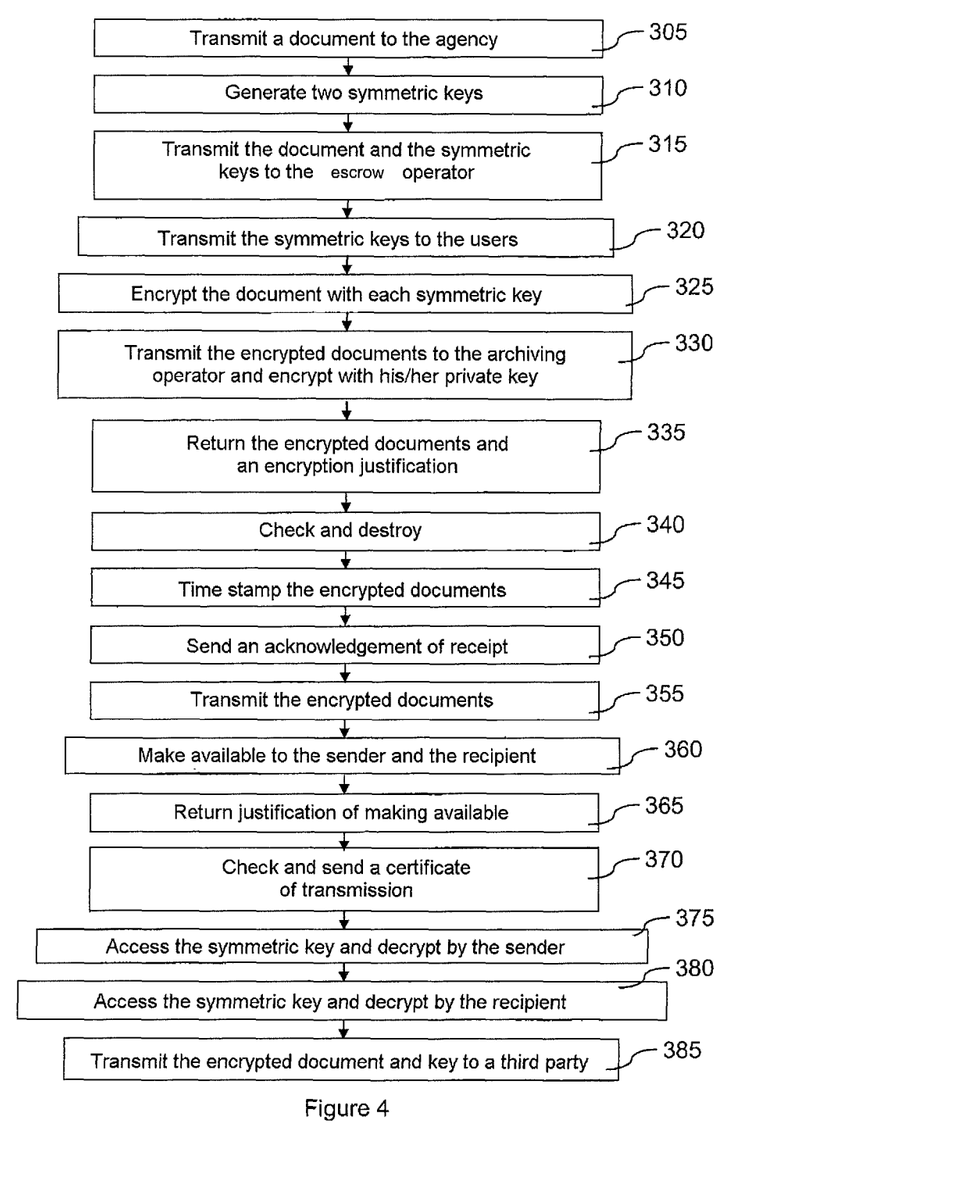
FIG. 4 represents, in the form of a flow diagram, a third particular embodiment method for personal archiving of a document suited to the case in which neither the sender nor the recipient has a personal dual key.
Figure 6:
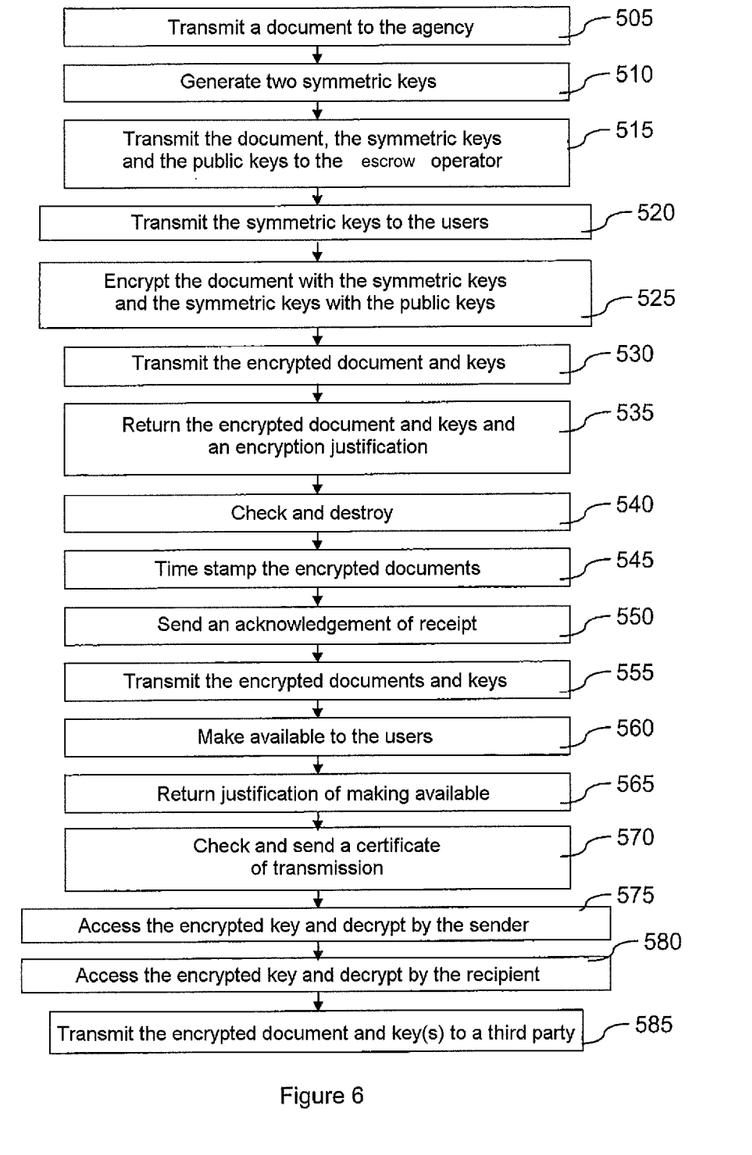
FIG. 6 represents, in the form of a flow diagram, a fifth particular embodiment method for personal archiving of a document suited to the case in which the sender and the recipient have a personal dual key.

It should be noted that, in FIGS. 4 and 6, it has been assumed that the sender and the recipient were linked to the same transmission operator and to the same agency. Should they be linked to different operators and agencies, the steps concerning the encrypted documents mentioned in these figures, for the transmission operator and for the agency, would be performed, in parallel and separately, by the two operators and two agencies concerned.

As can be seen in FIG. 4, to perform an encrypted transmission of a document from a sender to a recipient, the terminal 125 transmits this document unencrypted, to the scheduling and certification agency 105, during a step 305.

During a step 310, the agency 105 generates two different symmetric encryption keys intended, respectively, for the sender and for the recipient.

Then, during a step 315, the agency 105 transmits the document and the symmetric keys to the escrow operator 110. During a step 320, the agency 105 transmits the symmetric key of the sender to the private management office "BPG" of the sending user and the symmetric key of the recipient sender to the private management office of the recipient.

During a step 325, the escrow operator 110 performs the encryptions of the document with each of the symmetric keys received during the step 315. During a step 330, the escrow operator 110 retains the symmetric keys and transmits the documents, encrypted with the symmetric keys, to the archiving operator who performs a second encryption, with his/her own private key, of the documents already encrypted with the symmetric keys and retains the doubly-encrypted documents.

During a step 335, the escrow operator returns to the agency 105 the documents encrypted with the symmetric keys and a summary list encryption justification, which justifies the carrying out of all of the steps provided to perform the encryptions.

During a step 340, the agency 105 checks the encryption justification, destroys the unencrypted document and the symmetric keys and has the unencrypted document retained by the receiving third party 110 destroyed.

During a step 345, the agency 105 performs a time-stamping of the encrypted document and of the encryption justification.

During a step 350, the agency 105 sends an acknowledgement of receipt and of time-stamped encryption certification to the escrow operator 110 and the escrow operator 110 retains this acknowledgement of receipt and of certification as well as the symmetric keys but destroys the encrypted documents.

During a step 355, the agency 105 transmits the encrypted documents to the transmission operator 120. During a step 360, the transmission operator 120 places the document encrypted with the symmetric key of the sender in the correspondence current account of the sender. During the step 360, the transmission operator 120 also places the document encrypted with the symmetric key of the recipient in the correspondence current account of the recipient. During a step 365, the transmission operator 120 returns to the agency 105, via the trusted third party 115, a summary list justification of the placement of the encrypted documents in correspondence current accounts. This justification represents the correct completion of all the steps linked to the placement of the encrypted documents in the correspondence current accounts.

During a step 370, the agency 105 transmits to the transmission operator 120 a time-stamped transmission certificate.

To reread the document, during a step 375, the sender accesses his/her symmetric key and decrypts the encrypted document. The step 375 is possibly carried out via the receiving third party with time-stamping and transmission to the agency 105 of a summary list decryption justification.

To read the document, during a step 380, the recipient accesses his/her symmetric key, via the receiving third party, and the encrypted document, and decrypts the encrypted document. At the end of this operation, a time-stamping and a transmission to the agency 105 of a summary list decryption justification are performed.

If necessary, for example for legal instruction operations and/or on rogatory commission, during a step 385, one of the symmetric keys retained by the escrow operator and the corresponding encrypted document retained by the archiving operator are transmitted to a third party who decrypts the encrypted document with the symmetric key.

In a variant of the embodiment illustrated in FIG. 4, the two symmetric keys are identical.

Figure 5:
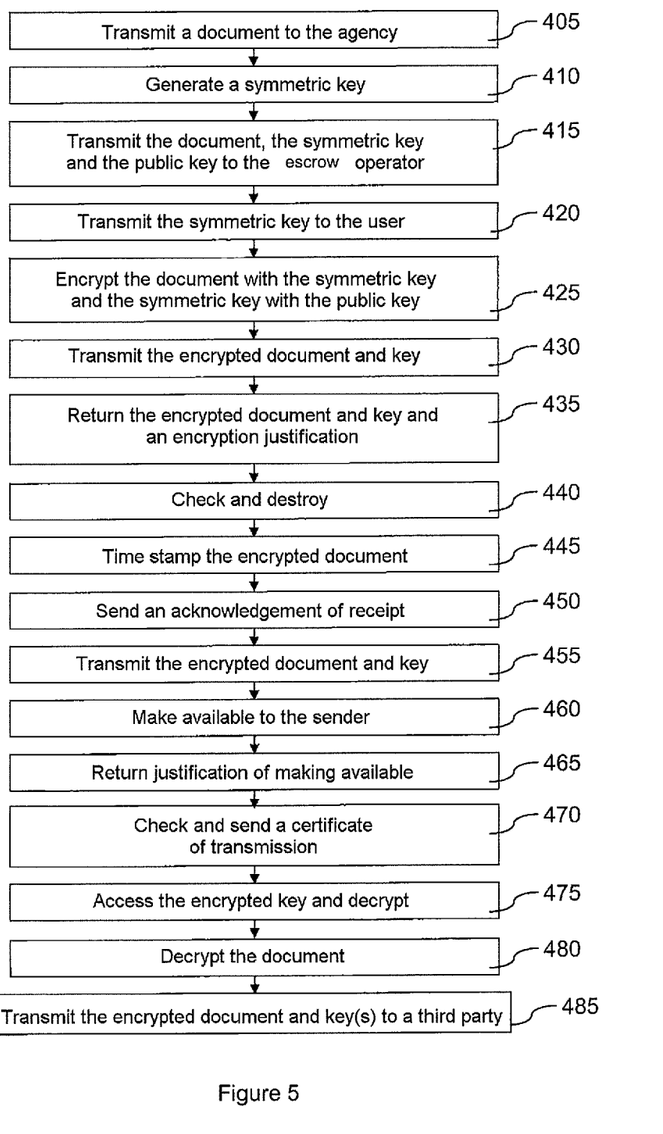
FIG. 5 represents, in the form of a flow diagram, a fourth embodiment method for transmission of a document suited to the case in which the sender is also the recipient and has a personal dual key.

As can be seen in FIG. 5, to perform an encrypted archiving of a document when the sender has a dual key, the terminal 125 transmits this document unencrypted, to the scheduling and certification agency 105, during a step 405.

During a step 410, the agency 105 generates a symmetric encryption key. As a variant, it is the terminal 125 of the sending user which supplies this symmetric encryption key to the agency 105.

Then, during a step 415, the agency 105 transmits the document, the symmetric key and the public key of the sender to the escrow operator 110. During a step 420, the agency 105 transmits this symmetric key to the private management office "BPG" of the sending user.

During a step 425, the escrow operator 110 performs the encryption of the document with the symmetric key received during the step 415 and the encryption of the symmetric key with the public key of the sender. During a step 430, the escrow operator 110 retains the symmetric key and transmits the document, encrypted with the symmetric key and the symmetric key encrypted with the public key of the sender, to the archiving operator who performs a third encryption, with his/her own private key, of the document already encrypted with the symmetric key and of the symmetric key encrypted with the public key of the sender and retains the doubly-encrypted document and the doubly-encrypted key.

During a step 435, the escrow operator returns to the agency 105 the document encrypted with the symmetric key, the symmetric key encrypted with the public key of the sender and a summary list encryption justification which justifies the carrying out of all of the steps provided to perform the encryptions.

During a step 440, the agency 105 checks the encryption justification, destroys the unencrypted document and the symmetric key and has the unencrypted document retained by the receiving third party 110 destroyed.

During a step 445, the agency 105 performs a time-stamping of the encrypted document and of the encryption justification.

During a step 450, the agency 105 sends an acknowledgement of receipt and of time-stamped encryption certification to the escrow operator 110 and the escrow operator 110 retains this acknowledgement of receipt and of certification as well as the encrypted symmetric key of the sending user, but destroys the encrypted document and the unencrypted symmetric key.

During a step 455, the agency 105 transmits the encrypted document and the encrypted symmetric key to the transmission operator 120. During a step 460, the transmission operator 120 places the encrypted document and the encrypted symmetric key in the correspondence current account of the sender. During a step 465, the transmission operator 120 returns to the agency 105, via the trusted third party 115, a summary list justification of the placement of the encrypted document and of the encrypted symmetric key in the correspondence current account of the sender. This justification represents the correct completion of all the steps linked to the placement of the encrypted document and of the encrypted symmetric key in the correspondence current account of the sending user.

During a step 470, the agency 105 transmits to the transmission operator 120 a time-stamped transmission certificate.

To reread the document, during a step 475, the sender accesses the encrypted symmetric key, decrypts it with his/her private key and, during a step 480, the sender decrypts the encrypted document. The steps 475 and 480 are possibly carried out via the receiving third party with time-stamping and transmission to the agency 105 of a summary list decryption justification.

If necessary, for example for legal instruction operations and/or on rogatory commission, during a step 485, the encrypted symmetric key retained by the escrow operator, the encrypted document retained by the archiving operator and the private key retained by a trusted third party (not represented) are transmitted to a third party which decrypts the encrypted document with this symmetric key after having decrypted the symmetric key with the private key of the sender.

In a variant, during the step 450, the unencrypted symmetric key is retained by the escrow operator and, during the step 485, the escrow operator transmits this unencrypted symmetric key to the third party responsible for the decryption.

It will be noted that the sender can consult the document in two ways.

Either he/she asks the archiving third party to upload to his/her private management office only the document encrypted with the symmetric key of which he/she holds the double in this same office. With the second symmetric key, he/she can read the encrypted document in his/her private management office.

The sender can also ask the archiving third party to transfer to his/her workstation all of the document encrypted by the symmetric key, and the symmetric key encrypted by his/her public key. On receiving the batch of these two encrypted items, he/she begins by decrypting the symmetric key with his/her personal private key. Then, he/she uses the decrypted symmetric key to decrypt the encrypted document.

There is also, for the Citizen Strong Box, another possibility which is to have the symmetric key retained by the escrow operator and not by the private management office of the sender. However, in this case, the sender cannot use his/her private management office to decrypt the document since he/she does not have the necessary symmetric key. However, he/she can ask for the encrypted document and the encrypted symmetric key to be transferred to his/her workstation to decrypt everything by first using his/her private key to decrypt the symmetric key used to decrypt the document.

This option is preferably retained under the assumption that the member has a digital national identity card working with an electronic citizen strong box.

As can be seen in FIG. 6, to perform an encrypted transmission of a document to a recipient, when the sender and the recipients have dual keys, the terminal 125 transmits the document unencrypted, to the scheduling and certification agency 105, during a step 505.

During a step 510, the agency 105 generates two symmetric encryption keys intended, respectively, for the sender and for the recipient. In a variant, it is the terminal 125 of the sending user which supplies these symmetric encryption keys to the agency 105.

Then, during a step 515, the agency 105 transmits the document, the symmetric keys and the public keys of the sender and of the recipient to the escrow operator 110. During a step 520, the agency 105 transmits these symmetric keys to the private management offices "BPG", respectively of the sender and of the recipient.

During a step 525, the escrow operator 110 performs the encryption of the document with each symmetric key received during the step 515 and the encryption of the symmetric keys with the public keys respectively of the sender and of the recipient. During a step 530, the escrow operator 110 retains the symmetric keys and transmits the documents encrypted with the symmetric keys and the symmetric keys encrypted with the public keys of the sender and of the recipient, to the archiving operator who performs a third encryption, with his/her own private key, of the documents already encrypted with the symmetric keys and of the symmetric keys encrypted with the public keys and retains the doubly-encrypted documents and the doubly-encrypted keys.

During a step 535, the escrow operator returns to the agency 105 the documents encrypted with the symmetric keys, the symmetric keys encrypted with the public keys of the users and a summary list encryption justification which justifies the carrying out of all of the steps provided to perform the encryptions.

During a step 540, the agency 105 checks the encryption justification, destroys the unencrypted document and the symmetric keys.

During a step 545, the agency 105 performs a time-stamping of the encrypted documents and of the encryption justification.

During a step 550, the agency 105 sends a time-stamped acknowledgement of receipt and of encryption certification to the escrow operator 110 and the escrow operator 110 retains this acknowledgement of receipt and of certification but destroys the encrypted documents and the unencrypted symmetric keys.

During a step 555, the agency 105 transmits the encrypted documents and the encrypted symmetric keys to the transmission operator 120. During a step 560, the transmission operator 120 places the encrypted documents and the encrypted symmetric keys in the correspondence current accounts respectively of the sender and of the recipient. During a step 565, the transmission operator 120 returns to the agency 105, via the trusted third party 115, a summary list justification of the placement of the encrypted documents and the encrypted symmetric keys in correspondence current accounts.

During a step 570, the agency 105 transmits to the transmission operator 120 a time-stamped transmission certificate.

To reread the document, during a step 575, the sender accesses his/her encrypted symmetric key, decrypts it with his/her private key and decrypts the encrypted document available in his/her correspondence account. The step 575 is possibly carried out via the receiving third party with time-stamping and transmission to the agency 105 of a summary list decryption justification.

To read the document, during a step 580, the sender accesses his/her encrypted symmetric key, decrypts it with his/her private key and decrypts the encrypted document available in his/her correspondence account. The step 580 is possibly carried out via the receiving third party with time-stamping and transmission to the agency 105 of a summary list decryption justification.

If necessary, for example for legal instruction operations and/or on rogatory commission, during a step 585, an encrypted symmetric key retained by the escrow operator, the corresponding encrypted document, retained by the archiving operator and the corresponding private key, retained by a trusted third party (not represented) are transmitted to a third party which decrypts the document encrypted with this symmetric key after having decrypted the symmetric key with the private key of one of the users.

In a variant, during the step 550, the unencrypted symmetric keys are retained by the escrow operator and, during the step 485, the escrow operator transmits one of these unencrypted symmetric keys to the third party responsible for the decryption.

It can be seen that embodiments of the present invention make it possible to create a personal document strong box for which the private key can be retained in an electronic identity card. The user can thus save copies of his/her identity papers, his/her diplomas, his/her insurance certificates, his/her payslips, his/her tax and social declarations, for example.

The invention claimed is:

1. A method for archiving a document for a user comprising:
   encryption of the document by a first computer system with a symmetric key provided by a computer server of a certification agency:
   transmission of said encrypted document to a computer server of an archiving operator;
   transmission of the symmetric encryption key of said document to a computer server of an escrow operator distinct from the computer server of the archiving operator; and
   encryption, by the escrow operator, of the symmetric encryption key with a public key of the user;
   transmission, by the escrow operator, of the symmetric encryption key encrypted with the public key of the user to the archiving operator; and
   encryption, by the computer server of the archiving operator, of the symmetric key encrypted with the public key of the user with a key having a dual-key comprising asymmetric keys; and
   transmission by the computer server of the archiving operator of the encrypted document to the user;
   transmission by the computer server of the escrow operator of the symmetric encryption key of the encrypted document to the user; and
   decryption by a computer system of the user of the encrypted document with the symmetric key.

2. The archiving method of claim 1, further comprising a step of generation of said symmetric key for each document to be encrypted.

3. The archiving method of claim 1, wherein said symmetric key is different for each document to be encrypted.

4. The archiving method of claim 1, wherein the public key used during the step of encryption with the public key is an asymmetric key of a user having transmitted said document.

5. The archiving method of claim 1, wherein the public key used during the step of encryption with the public key is an asymmetric key of a user receiving the document.

6. The archiving method of claim 1, further comprising a step of deletion of the encrypted document and of retention of the symmetric key by the first computer system, and the first computer system is the computer server of the escrow operator.

7. The archiving method of claim 1, further comprising:
   transmission by the computing server of the archiving operator of the encrypted document to an authorized third party;
   transmission of the symmetric encryption key of the encrypted document by the computing server of the escrow operator to the authorized third party; and
   decryption by the authorized third party of the encrypted document with the symmetric key.

8. A system for archiving a document by a user comprising:
   a processor;
   a memory for storing instructions configured to be executable by the processor to perform functions of the following modules;
   a module configured to encrypt said document with a symmetric key provided by a certification agency;
   a module configured to transmit said encrypted document to an archiving operator;
   a module for transmitting the symmetric encryption key of said document to an escrow operator distinct from the archiving operator;
   a module for encrypting, by the escrow operator, of the symmetric encryption key with a public key of the user;
   a module for transmitting to the archiving operator, by the escrow operator, the symmetric encryption key encrypted with the public key of the user; and
   a module for encrypting, by the archiving operator, the symmetric key encrypted with the public key of the user with a key having a dual key comprising asymmetric keys; and
   a module configured to handle the transmission of the encrypted document by the archiving operator to the user;
   a module configured to handle the transmission of the symmetric encryption key of the encrypted document by the escrow operator to the user; and
   a module configured to handle the decryption by the user of the encrypted document with the symmetric key.

9. The archiving device of claim 8, further comprising a means for generating said symmetric key for each document to be encrypted.

10. The archiving device of claim 8, wherein said symmetric key is different for each document to be encrypted.

11. The archiving device of claim 8, further comprising:
   a module configured to handle the transmission of the encrypted document by the archiving operator to an authorized third party;
   a module configured to handle the transmission of the symmetric encryption key of the encrypted document by the escrow operator to the authorized third party; and
   a module configured to handle the decryption by the authorized third party of the encrypted document with said symmetric key.

* * * * *